United States Patent Office 2,824,129
Patented Feb. 18, 1958

2,824,129

PROCESS FOR THE PRODUCTION OF AROMATIC HYDROXYCARBOXYLIC ACIDS

Herbert Nordt, Julius Wehn, and Detlef Delfs, Leverkusen-Bayerwerk, Germany, assignors to Farbenfabriken Bayer Aktiengesellschaft, Leverkusen, Germany, a corporation of Germany No Drawing. Application April 22, 1955
Serial No. 503,336

Claims priority, application Germany April 26, 1954

5 Claims. (Cl. 260—521)

This invention relates to aromatic hydroxycarboxylic acids and to a process for producing the same.

It is known that aromatic hydroxycarboxylic acids can be obtained by the action of carbon dioxide on the solid alkali salts of aromatic hydroxy compounds. It has also already been proposed (cf. German specification No. 624,318) to carry out this reaction in the presence of phenolic solvents. Such phenolic solvents have the advantage, as compared with other solvents, that they are able to dissolve the alkali salts of the hydroxy compounds to a considerable degree. Nevertheless, it has so far not been possible to carry out the carboxylation of aromatic hydroxy compounds continuously, since the reaction times necessary for quantitative reaction are too long and partial reaction has to be avoided because it is difficult to separate the reaction product from unreacted alkali phenate.

It is an object of the present invention to provide a process for the continuous carboxylation of aromatic hydroxy compounds. Another object is to accomplish this process in an economical manner. Further objects will appear hereinafter.

These objects are obtained in accordance with the present invention by reacting an alkali salt of an aromatic hydroxy compound with carbon dioxide in the presence of a phenolic solvent, wherein the reaction is carried out continuously and with a carbon dioxide pressure of at least 50 atmospheres. A practically quantitative yield can be obtained in a very short reaction time by this process.

The following table sets out the results produced by reacting carbon dioxide with suspensions containing 20 or 25 percent by weight of sodium phenate in phenol to form sodium salicylate, and clearly shows the degree to which the raising of the pressure of the carbon dioxide increases the reaction velocity.

the reaction. For example, in the production of salicylic acid from sodium phenate, it is possible to use o-tertiary butyl phenol as the phenolic solvent: this has the advantage that salicylic acid can be separated in a particularly simple manner from the reaction product after the reaction is complete.

Depending on the amount of the phenolic solvent which is used, either solutions or suspensions of the alkali salts of the aromatic hydroxy compounds are reacted with the carbon dioxide at high pressure. If suspensions are used, it is desirable for the diameter of the solid particles to be below $60\mu$; particles of this size can be obtained, for example, by means of high-speed mills. The solution or suspension of the alkali salt is then forced into a reaction chamber containing the carbon dioxide under pressure by means of a suitable pump, for example a plunger pump.

Generally speaking, it is preferred to work with suspensions rather than solutions of the alkali salts of the aromatic hydroxy compounds, in the interest of a higher yield per unit of volume and time.

The temperatures which are used in the present process are the same as are used in the discontinuous synthesis of aromatic hydroxy acids from hydroxy compounds; the temperature used in a particular case depends on the nature of the hydroxy compound used. For example, for the synthesis of salicylic acid from sodium phenate it is desirable to use a temperature in the region of 150–160° C.

The process of the present invention is carried out with a carbon dioxide pressure of at least 50 atmospheres, but it is preferred to work with a carbon dioxide pressure in the region of 70–200 atmospheres, and even higher carbon dioxide pressures can be used with advantage. It has proved to be desirable to work with an excess of carbon dioxide and to agitate the reaction mixture in the pressure chamber by means of carbon dioxide.

The aromatic hydroxycarboxylic acids which are produced by the process of the present invention leave the reaction chamber, in the form of alkali salts of the acids, as suspensions in the phenolic solvent used, since they are practically insoluble therein. The excess carbon dioxide can be recycled, either as gas or in liquid form, after being separated from the reaction product. The alkali salts of the hydroxycarboxylic acid can then be freed from the phenolic solvents, for example by centrifuging, and thereafter worked up in known manner.

The process of the present invention represents a valuable contribution to the art, since the use of this process allows aromatic hydroxy acids to be manufactured continuously with a high yield per unit of volume and time.

| Test No. | Phenate content, percent | CO$_2$ pressure in atm. | Temp., °C. | Reaction Time, hours | Yield of salicylic acid | Amount of unreacted phenate |
|---|---|---|---|---|---|---|
| 1 | 20 | 70 | 150 | ½ | 89.5% of the theoretical. | 10.5% of the mixture. |
| 2 | 20 | 188 | 150 | ½ | 99.3% of the theoretical. | 0.7% of the mixture. |
| 3 | 25 | 58 | 160 | 1 | 92.3% of the theoretical. | 7.7% of the mixture. |
| 4 | 25 | 191 | 150 | 1 | 99.3% of the theoretical. | 0.7% of the mixture. |

Examples of aromatic hydroxy compounds which can be used in the process of the present invention are phenol, substituted phenols, naphthols, hydroxyquinolines and hydroxycarbazole.

The phenolic solvent to be used in the process of the invention can be the corresponding free aromatic hydroxy compound itself, for example phenol in the production of salicylic acid from sodium phenate, or another aromatic hydroxy compound which is inert under the conditions of The following examples are for the purpose of illustrating the invention without, in any way, limiting it.

Example 1

A completely anhydrous suspension of 20 parts by weight of sodium phenate in 80 parts by weight of phenol, heated to about 100 to 120° C., is first of all passed through a homogenising mill and is then forced by means of a pressure pump at a rate of 20 kilograms per hour through a preheater, and then from below into a vertically disposed stainless steel high-pressure tube which has an internal diameter of 70 millimeters and a height of about 2½ meters. In this tube a carbon dioxide pressure of 200 atmospheres is maintained at a temperature of 150° C. The stream of carbon dioxide likewise travels in an upward direction. The reactants remain in this reaction vessel for about half an hour; they then leave this vessel and are cooled to 40–60° C. and separated into a liquid phase and a gaseous phase in an expansion vessel. The carbon dioxide, together with fresh dry carbon dioxide, is returned under pressure to the reaction vessel, either as a gas by means of a gas-circulating pump or, after cooling to a low temperature, in liquid form by means of a liquid-circulating pump.

The suspension of sodium salicylate in the warm liquid phenol, collects in the lower part of the expansion vessel; this suspension is discharged into a collecting container and the carbon dioxide dissolved in the phenol is degasified and recycled. The sodium salicylate is separated by centrifuging by means of a tray-type centrifuge and is freed from phenol by suitable means, either by washing with benzene or by treatment with superheated dry steam. The phenol leaving the centrifuge is mixed with more sodium phenate and is recycled. The salicylic acid is liberated from the sodium salicylate in the conventional manner. A yield of about 99% of pure, white salicylic acid, with a melting point in the region of 155° C., is obtained.

*Example 2*

A suspension is used which consists of 20 parts by weight of anhydrous sodium phenate in 80 parts by weight of a mixture of o- and p-tertiary butyl phenol; this mixture is liquid at room temperature and is in the form which is obtained in known manner by butylation of phenol. This suspension is continuously treated, as described in Example 1, at about 150° C. in an apparatus containing carbon dioxide under a pressure of about 150 atmospheres. A yield of about 98% of pure white salicylic acid is obtained.

*Example 3*

In the apparatus described in Example 1, an anhydrous sludge at a temperature of about 130° C., obtained from 20 parts by weight of the sodium salt of β-naphthol in 80 parts by weight of molten β-naphthol is first heated to 150° C. under a carbon dioxide pressure of about 190 atmospheres, and is then treated at 245° C. until the reaction product is relieved of pressure after a total residence time of about one hour. After working up, which is carried out in known manner, there is obtained a yield of 83% of 2,3-hydroxy-naphthoic acid with a melting point of 214° C. (uncorr.).

*Example 4*

An anhydrous mixture of 20 parts by weight of the sodium salt of 3,4-dimethyl phenol and 80 parts by weight of phenol is treated in the manner explained in Example 1 with carbon dioxide at about 150° C. under a pressure of about 150 atmospheres. There is obtained a yield of about 96% of pure 3,4-dimethylphenol-carboxylic acid-6 with a melting point of 201° C. (uncorr.).

We claim:

1. In the process for the production of aromatic hydroxy carboxylic acids in which an alkali salt of an aromatic hydroxy compound is carboxylated by reaction with carbon dioxide, the improvement which comprises effecting the reaction between the alkali salt of the aromatic hydroxy compound and the carbon dioxide at a temperature between about 100–245° C. in the presence of a phenol as a solvent and with a carbon dioxide pressure of at least about 50 atmospheres.

2. In the process for the production of salicylic acid in which sodium phenate is carboxylated by reaction with carbon dioxide, the improvement which comprises effecting the reaction of sodium phenate with carbon dioxide at a temperature between about 150–160° C. in the presence of phenol as a diluent and at a carbon dioxide pressure of at least about 50 atmospheres.

3. Improvement according to claim 2, in which said reaction is continuously effected.

4. Improvement according to claim 2, in which said reaction is effected at a carbon dioxide pressure of between about 150 and 200 atmospheres.

5. Improvement according to claim 4, in which said reaction is effected continuously.

References Cited in the file of this patent

UNITED STATES PATENTS

| 150,867 | Kolbe | May 12, 1874 |
|---|---|---|
| 2,453,105 | Cranford et al. | Nov. 2, 1948 |

FOREIGN PATENTS

| 624,318 | Germany | Feb. 25, 1936 |
|---|---|---|

OTHER REFERENCES

Wagner et al.: Synthetic Organic Chemistry, p. 426 (1953).